Dec. 13, 1960 J. F. TALAK 2,964,016
CONTROL FOR HYDRAULIC POWER LIFTS
Filed Oct. 23, 1956 3 Sheets-Sheet 1
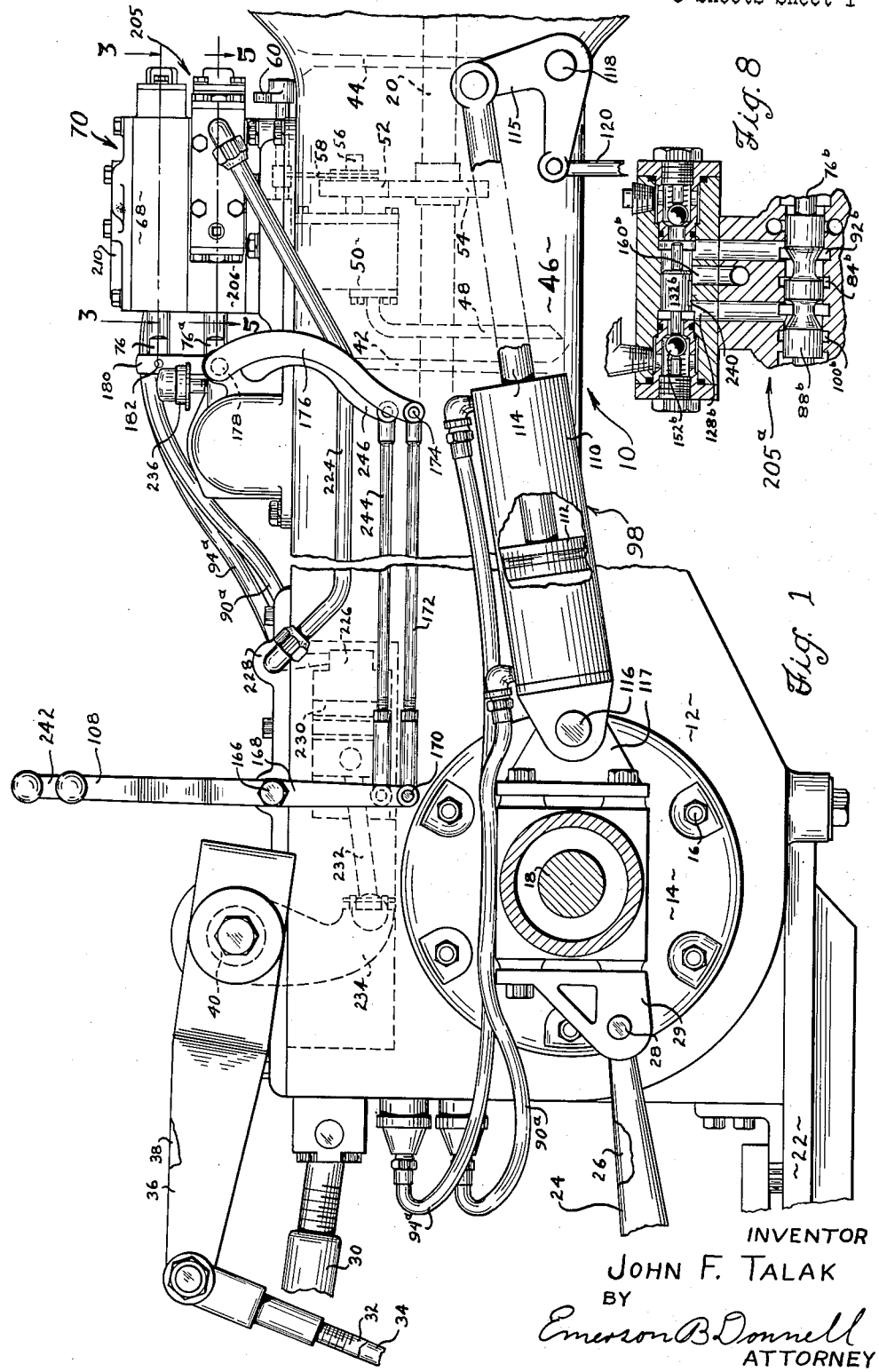
INVENTOR
JOHN F. TALAK
BY
Emerson B. Donnell
ATTORNEY Dec. 13, 1960 J. F. TALAK 2,964,016
CONTROL FOR HYDRAULIC POWER LIFTS
Filed Oct. 23, 1956 3 Sheets-Sheet 2

INVENTOR
JOHN F. TALAK
BY
Emerson B Donnell
ATTORNEY

Dec. 13, 1960  J. F. TALAK  2,964,016
CONTROL FOR HYDRAULIC POWER LIFTS
Filed Oct. 23, 1956  3 Sheets-Sheet 3
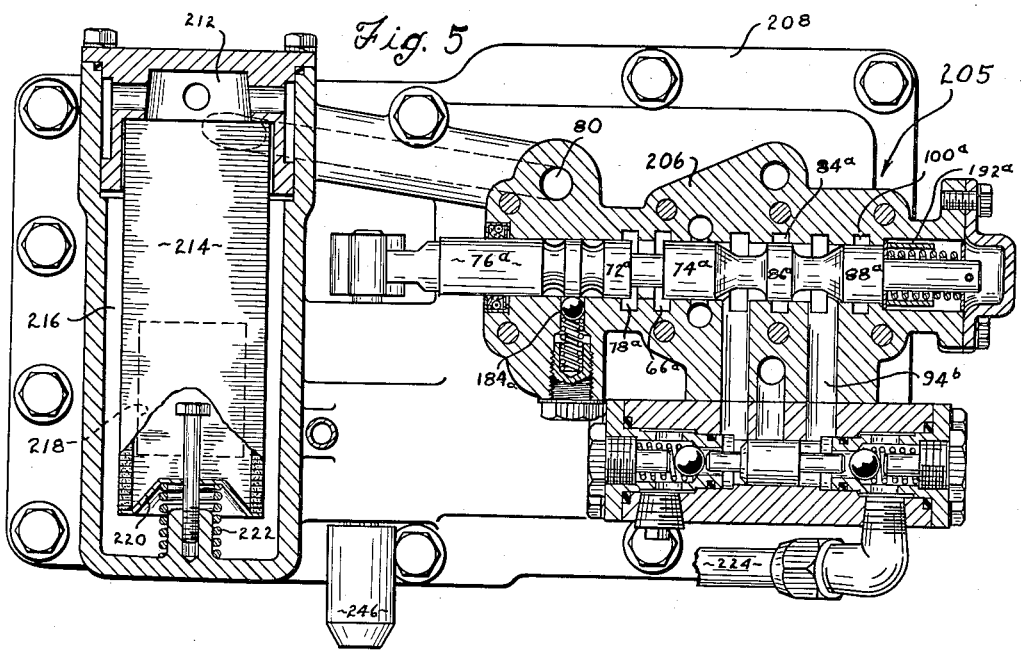
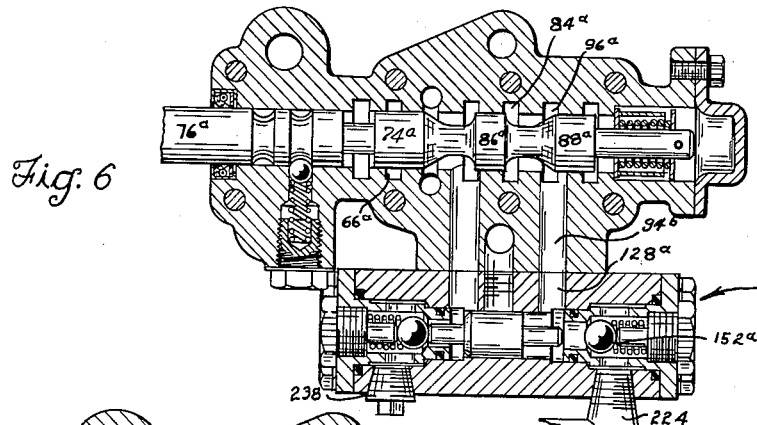
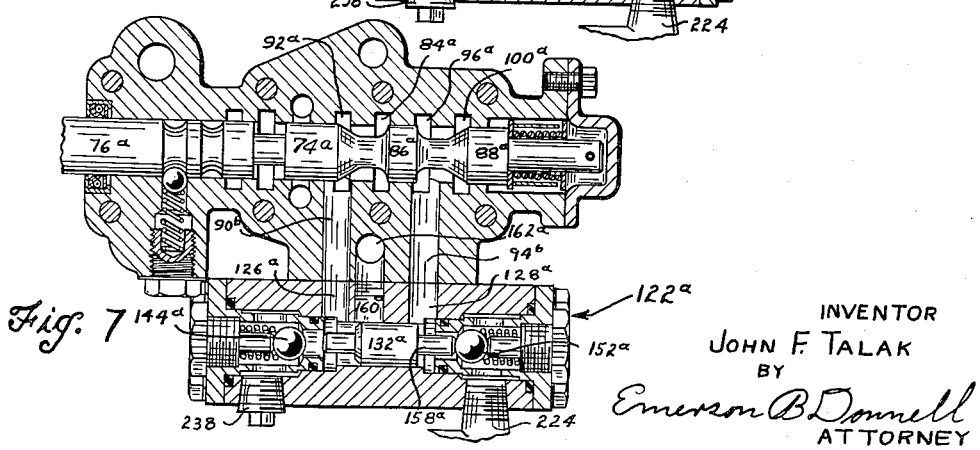
INVENTOR
JOHN F. TALAK
BY
Emerson B. Donnell
ATTORNEY United States Patent Office 2,964,016
Patented Dec. 13, 1960

2,964,016

CONTROL FOR HYDRAULIC POWER LIFTS

John F. Talak, Silvis, Ill., assignor to J. I. Case Company, Racine, Wis., a corporation of Wisconsin Filed Oct. 23, 1956, Ser. No. 617,865

5 Claims. (Cl. 121—40)

The present invention relates to hydraulic power-lifts, and controls therefor, and an object thereof is to generally improve the construction and operation of devices of this class.

A further object is to provide a control of this nature which will have certain safety characteristics.

Hydraulic power-lifts have come into general use in connection with farm tractors, and particularly where tillage or other heavy implements are operated and carried directly on the tractors. In such instances, and in fact in any instance where a heavy implement or object is raised and lowered by a fluid operated cylinder or similar motor, there is the inherent possibility that the implement may be left unattended in a raised position, in which situation the weight of the implement will tend to actuate the fluid motor in one direction, such movement being solely resisted by the fluid pressure in the motor. Such motors are commonly controlled by valves governing the flow of fluid, and if someone inadvertently, or ignorant of the consequences, actuates the valve in a direction to release the pressure fluid from the motor, the implement would drop and might cause serious injury, and a further object of the invention is to provide a control valve combination in which this cannot occur.

A further object is to provide a control valve in which fluid cannot be released from the motor unless pressure fluid is first available from the supply. In other words, it is impossible to lower the implement unless the tractor engine (driving the fluid supply pump) is running, it being apparent that the operation of the tractor engine would render it likely that someone of sufficient understanding to supervise the operation and avoid accidents would be present.

A further object is to provide such a device which is adaptable with minor substitutions to use with a single acting or with a double acting power-lift motor.

A further object is to provide a control valve having characteristics giving exceptionally good control of a fluid motor, and particularly a slow drop or lowering of an implement controlled by such motor.

Further objects and advantages will be apparent from the following specification and accompanying drawings in which Fig. 1 is a right side elevation of so much of a tractor as necessary to illustrate the invention, with parts omitted for clarity and other broken away to show what lies beneath.

Fig. 5 is a horizontal sectional view taken on the line 5—5 of Fig. 1 enlarged.

Fig. 6 is a similar view with the parts in a different position.

Fig. 7 is a similar view with the parts in still another position.

Fig. 8 is a view of a fragment of the structure shown in Fig. 6 somewhat reduced and reversed in position showing a modification.

Figure 3:
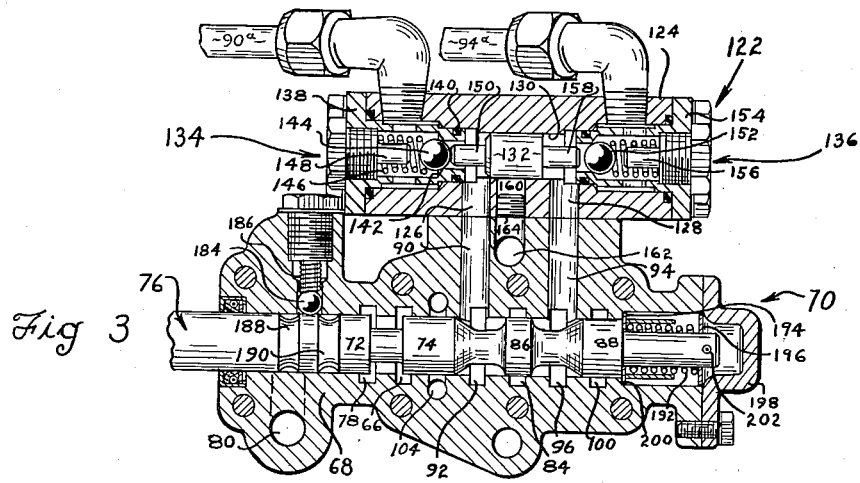
Fig. 3 is a horizontal sectional view taken on the line 3—3 of Fig. 1 enlarged.

As seen in Fig. 1, the tractor comprises a body or torque tube portion 10 joined to a transmission and rear axle portion 12, a portion having been broken out to permit showing of the device on a larger scale. An axle housing 14 suitably fastened to axle and transmission portion 12 as by bolts 16 houses a live axle 18 for driving a traction wheel, not shown. The tractor is provided with an engine of any suitable or well known type which actuates a shaft 20 from which drives are extended to the various functions of the tractor but which are not shown since they form no part of the present invention. The tractor also has a drawbar 22 which is of well known form, and a pair of hitch links 24 and 26 pivoted by pins as 28 to rigid parts of the tractor as suitable brackets 29 on axle housings 14. Implements of various types are attached from time to time to links 24 and 26 and guided by an upper adjustable link 30 in well-known manner, links 24 and 26 being connected by lifting rods 32 and 34 with lifting arms 36 and 38 fixed on a rockshaft 40. The tractor as so far described is of well-known form and the details form no part of the present invention.

Rockshaft 40 is actuated by a hydraulic mechanism which will presently be described.

Torque tube 10 is of generous proportions and preferably divided by partitions 42 and 44 to form a fluid reservoir 46, fluid being taken from reservoir 46 by a pipe 48 into a pump 50 driven in the present instance by a gear 52 engaged with a gear 54 fixed on and driven by above-mentioned shaft 20. Gear 52 is slidably carried on a shaft 56, being the power input shaft for pump 50, and may be shifted out of engagement with gear 54 by means of a shipper 58 controlled by a handle 60, shifting handle 60 forward disengaging gear 52 from gear 54.

Figure 2:
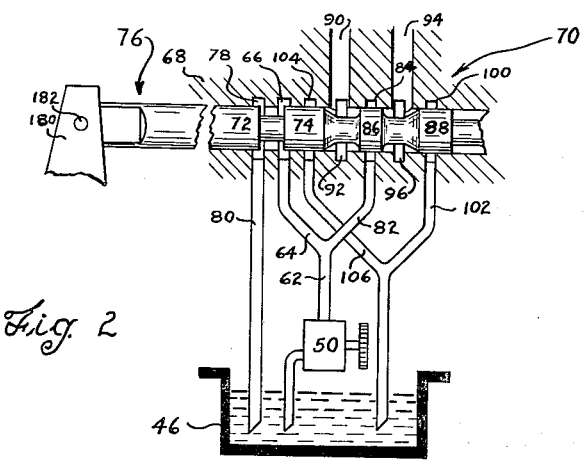
Fig. 2 is a schematic view or diagram of a spool type valve, a plurality of which are used in the tractor illustrated.

Turning now to Fig. 2, pump 50 has a discharge passageway 62 which has a branch 64 leading to a port 66 in a housing portion 68 of a distributing valve generally designated as 70. Fluid coming from pump 50 in branch 64 enters the space between lands 72 and 74 on a spool valve generally designated as 76, crossing to a port 78 connecting with a passageway 80, returning to reservoir 46. Thus pump 50 may run continuously without substantial back pressure, while being in readiness at all times to supply fluid under pressure for the purpose of the invention, it being observed that, if spool 76 is displaced, land 74 will block port 66 if such motion is to the left, while land 72 will block port 78 if such displacement is to the right. In either case, flow of fluid in passageways 62 and 64 will be interrupted so that fluid pressure will be substantially instantly developed in these passageways in a manner familiar in the art.

Passageway 62 also has a branch 82 leading to a port 84 which is blocked by a land 86, a land 88 being spaced from land 86 axially of valve 76 substantially to the same extent as land 74. A passageway or conduit 90 leads from a port 92 in housing 68 disposed between lands 74 and 86 while a passageway or conduit 94 leads from a port 96 disposed between lands 86 and 88. It will now be apparent that, if spool 76 is shifted, say, to the left, port 66 will be blocked, thereby causing pump 50 to supply pressure fluid in passageway branch 82. Land 86, however, will be displaced to the left of port 84 which, through the space between lands 86 and 88, will therefore communicate with port 96 and conduit 94. Conversely, if spool 76 is displaced to the right, branch 82 will be connected to port 92 and conduit 90. In this case, land 72 blocks port 78, again shutting off the flow in passageway 64 to provide pressure in the branch 82. As will be apparent, conduits 90 and 94 could be connected, as will be described presently, with a fluid cylinder or motor 98, Fig. 1, so that with spool 76 shifted, for example, to the right, fluid would be supplied to motor 98 through conduit 90, spent fluid returning from motor 98 through conduit 94. Under these conditions, land 88 would have moved to the right of a port 100 connecting with a passageway 102 leading to reservoir 46. On the other hand, if spool 76 is shifted to the left, pressure fluid will flow to motor 98 through passageway 94, spent fluid returning through passageway 90 and, since land 74 has been moved to the left, through a port 104 and passageway 106 to reservoir 46. In this way, motor 98 may be caused to perform as desired merely by shifting spool 76, which may be done by means of a handle 108 through suitable linkage which will be described presently.

Turning now to motor 98, this unit comprises, in the present instance, a cylinder 110, Fig. 1, in which is slidable a piston 112 fixed on a piston rod 114, cylinder 110 being suitably secured to a part of the tractor, for example, axle housing 14 as by a pin 116 and bracket 117. Piston rod 114 is connected to any desirable load, commonly a cultivator construction which is well known and not shown but which is suspended from a bell crank 115 fulcrumed on a pin 118 fixed in relation to torque tube portion 10, and exerts a substantial inward force (to the left in Fig. 1) against piston rod 114, the weight of the implement being applied through a lifting rod 120. Conduit 90 extends through a safety interlock to be described, as conduit 90a opening into the left end of cylinder 98, whereas conduit 94 extends, also through said safety interlock, as conduit 94a to the right end of cylinder 98. Assuming the parts completely full of pressure fluid, as is customary, application of pressure fluid through conduits 90 and 90a would cause a rightward movement of piston 112, fluid to the right of piston 112 being forced back through conduits 94a and 94 to passageway 102 as hereinbefore described. Conversely, fluid pressure applied to conduits 94 and 94a will cause leftward movement of piston 112 and return of fluid through conduits 90a and 90 to passageway 106.

Assuming piston 112 to have been moved, for example, to the position shown and supporting a heavy implement, it will be apparent that a substantial force will be exerted on piston 112 by the weight of said implement acting through bell crank 115, thus maintaining a high pressure in conduits 90a and 90 which is blocked by the position of land 74 obstructing port 104. Piston 112 will be maintained in position and the implement will be held suspended by the pressure fluid, and which will be true regardless of the operation of pump 50. If valve spool 76 is shifted to the left, conduit 90 will be connected with exhaust passageway 106, exhausting the pressure in conduits 90 and 90a and allowing the implement to drop. This will be true regardless of the fact that the tractor is stopped and pump 50 is not running. Thus a tractor, equipped as so far described and left with the implement raised and the engine stopped, becomes a source of danger in that the implement may drop unexpectedly merely upon shifting of the valve handle 108, the vacuum effect in conduit 94a, or atmospheric back pressure, being negligible in the face of the pressure necessary to support the implement, and it is an important object of the invention to eliminate the danger of such a mishap through a safety interlock which is interposed in conduits 90, 90a, 94, and 94a.

Turning to Fig. 3, it will be observed that valve spool 76 is positioned as seen in Fig. 2 and that passageway 90 is a drilled or cored opening in a casting constituting above-mentioned valve housing 68. As apparent, passageway 90 continues as conduit 90a and similarly passageway 94 continues as conduit 94a, the above-mentioned safety interlock being generally designated as 122 and interposed in both of these conduits as aforesaid. Interlock 122 is arranged in a housing or body portion 124 having ports 126 and 128 communicating with and forming parts of above-mentioned passageways 90 and 94 and leading into a bore 130 in the present instance transverse to ports 126 and 128 and disposed longitudinally in body portion 124. Bore 130 is closed and, in the present instance, substantially completely occupied by a movable abutment, wall, or plunger 132 slidable in the bore in a substantially fluid tight manner, thus separating passageway 90 from passageway 94. Passageway 90 communicates through an outwardly opening non-return valve generally designated as 134 with above-mentioned conduit 90a while passageway 94 communicates through an outwardly opening non-return valve generally designated as 136 with conduit 94a. Non-return valves 134 and 136 are preferably identical and only one will be described in detail.

Valve 134 comprises a cage 138 inserted in the left end of bore 130, which is slightly enlarged as shown, and has a fluid tight packing 140 confining liquid flow to a shouldered bore 142 in which is seated a valve member or ball 144 under pressure of a spring 146. A stop member 148 positioned within spring 146 and fixed in relation to cage 138 prevents excessive movement of ball 144 and, incidentally, of plunger 132, the latter having a finger 150 which engages ball 144 at times as will appear presently. A similar ball 152 is seated in a cage 154 and controlled by a stop 156, plunger 132 having a finger 158 engaging ball 152, also as will appear.

A port 160 leads out of bore 130 and connects with a bore 162 leading to reservoir 46, but is not used in the Fig. 3 arrangement, so is closed by a plug 164.

It will now be apparent that, with an implement suspended as indicated in Fig. 1 and causing pressure in conduit 90a, fluid flow out of conduit 90a will be prevented by valve member 144. Assuming now that pump 50 is not running, it will be apparent that any shifting of valve spool 76 to the left in Fig. 3 and which would connect passageway 90 with exhaust port 104 would have no effect on the pressure in conduit 90a, since valve member 144 would remain seated and prevent any flow of fluid out of conduit 90a. If the force applied to piston 112 happened to be in the other direction, there would be pressure in conduit 94a but again, movement of valve spool 76 to the right would merely exhaust passageway 94 and not conduit 94a, valve 152 remaining on its seat. Since there is no means of access to valves 144 and 152, there is no potential danger in the suspended implement, since manipulation of valve spool 76 will have no effect.

Figure 4:
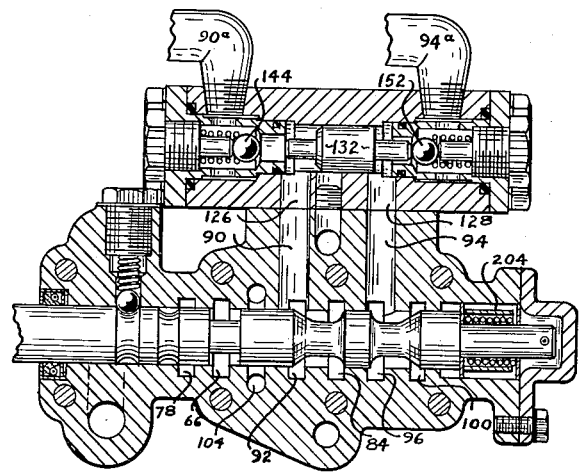
Fig. 4 is a similar view with the parts in a different position.

When it is desired to raise or lower the implement or to move piston 112, it is necessary to first put pump 50 into operation which, as hereinbefore explained, makes possible the instantaneous building up of pressure in port 84. Assuming it is desired to raise the implement further, valve spool 76 is moved to the right as seen in Fig. 4. As explained in connection with Fig. 2, this will block port 78 and cause pressure to build up in port 84, which pressure will be communicated to port 92 and through passageway 90 to port 126. This pressure communicated through bore 142 will force valve member 144 off its seat, the fluid passing on through conduit 90a to act in the desired manner on piston 112. This action, of course, requires the exhausting of fluid from the opposite side of piston 112 through conduit 94a previously blocked by valve member 152. Pressure fluid in port 142, however, in addition to opening valve 144 will force abutment 132 to the right, whereupon finger 158 will unseat valve member 152 and allow fluid in conduit 94a to flow backwardly past valve 152, through port 128, and passageway 94. This fluid flows by way of ports 96 and 100 through passageway 102 back to reservoir 46. Thus control of piston 112 is complete and without any interference from interlock 122 so long as pressure is available in port 84.

With pump 50 running, shifting valve spool 76 to the left will cause outward flow in conduit 94a and return or exhaust of fluid through conduit 90a in a manner similar to that above described as will be apparent to those skilled in the art.

Returning to a more detailed description of the control mechanism for spool 76, lever 108, Fig. 1, is pivoted on a fulcrum 166 and has an arm 168 pivoted at 170 to a link 172 which connects at 174 with a lever arm 176. Lever arm 176 is fixed in relation to a shaft 178 which carries a lever arm 180 pivoted to spool 76 by means of a pin 182. Rocking of lever 180 will thus cause sliding movement of spool 76. A detent 184, Fig. 3, pressed by a spring 186 engages grooves 188 and 190 respectively upon movement of spool 76 to the right or left, to yieldably maintain spool 76 in its two extreme positions. To assist in bringing the spool to its central position as seen in Fig. 3, a spring 192 is compressed between a washer 194 engaged with land 88 and a washer 196, which it presses outwardly against a cover plate or cap 198. Washer 194 bears against a shoulder 200 in body portion 68 as well as against land 88, while a pin 202 in a portion of spool 76 engages the outer side of washer 196. With washers 194 and 196 engaged as described, spring 192 will have its greatest length, and spool 76 will be held in its middle or neutral position. In Fig. 4, washer 194 has been pressed toward washer 196 by reason of movement of spool 76 to the right, and any appreciable further movement will engage a sleeve 204 between the washers and block any further movement. In this manner spool 76 is prevented from being moved beyond a suitable operating position. As will be apparent, shifting of spool 76 to the left will also cause compressing of spring 192 by reason of movement of washer 196, as seen in Fig. 6, to which further reference will be had presently.

The foregoing description presupposes the use of what is known as a double acting cylinder or motor in which the fluid pressure can be brought to bear on either side of the piston. However, this is not always the case and in many tractors a motor or cylinder is used in which the pressure fluid acts only on one side, the other side being vented to the atmosphere, and it is not unusual for both types of hydraulic motor to be used on a single tractor. Such is the case in the tractor illustrated and in order to safeguard this type of system, the identical structure just described can be used without alteration excepting the removal of plug 164 and omission of conduit 94a, the connection for the latter being plugged as shown in Figs. 5, 6, and 7.

To facilitate manufacture, valve 68 is so arranged that a plurality of identical units may be stacked one on top of the other, the necessary fluid passageways matching to give the necessary fluid supply and fluid exhaust to the reservoir. Thus a valve body 206, Fig. 5, identical with valve body 68 in Fig. 3 is bolted in place on a plate 208, forming the top of torque tube 10, valve body 206 being reversed or turned over with respect to valve body 68 which facilitates attaching the several conduits. A port 84a is blocked by a land 86a on a valve spool 76a, port 84a communicating through suitable matching passageways not shown, with above-mentioned port 84. In a similar manner, valve body 206 has ports 78a and 66a which are blocked respectively by lands 72a and 74a upon right or left movement of spool 76a. Port 66a receives fluid from above-mentioned passageway 64, whereas port 78a communicates through suitable matching passageways with above-mentioned port 66. Thus the fluid, when pump 50 is running, and no pressure is desired, passes serially through ports 66a, 78a, 66, and 78, finally exhausting through passageway 80 which is in reality a labyrinthine course of matching ducts formed in bodies 68, 206, and a cover plate 210, Fig. 1. Such passageways being well known and forming in themselves no part of the invention, they need not be described further.

As seen in Fig. 5, passageway 80 ends in a cored duct in cover plate 208, leading into a filter chamber 212, interiorly of a filtering element 214, so that bypassing fluid in passageway 80 is directed into the interior of filtering element 214, filtering therethrough into chamber 216, whence it drains into reservoir 46 through an opening 218. Filtering element 214 is closed at its end by a cap 220 yieldingly held in place by a spring 222, the construction being substantially identical with that shown in the patent to Talak No. 2,747,743, May 29, 1956, to which reference may be had for a complete disclosure. Since filtering element 214 is in operation at all times, and not merely when lifting is being accomplished, the entire quantity of fluid in the system will find its way through the filter in a short time and, of course, many times in the course of a few hours' operation, and as a result, the fluid is kept substantially free from suspended particles which might interfere with the reliability of some of the components.

Valve 205 controls the fluid in a conduit 224 leading into a cylinder 226 Fig. 1, incorporated in a cover plate 228 forming the upper enclosure of transmission housing 12, and having a piston 230 connected by a pitman 232 with a crank arm 234 enclosed within transmission housing 12 and fixed on above-mentioned shaft 40. Leftward movement of piston 230 will accordingly cause clockwise rocking or rotation of crank arm 234, shaft 40, and arms 36 and 38, thereby raising any load imposed upon lifting rods 32 and 34. While pressure fluid is introduced to the right side of piston 230, the left side thereof is open to transmission case 12 which is normally vented to the atmosphere, the whole interior of transmission housing 12 and cover plate 210 communicating with a breather or ventilating cap 236. It will therefore be apparent that cylinder 226 is of the single acting variety in which fluid is introduced by conduit 224 and returned or exhausted through the same conduit, no fluid connection being made to the other end of the cylinder. This type of cylinder can be actuated and safeguarded as hereinbefore stated by a substantially identical valve to that heretofore described.

Referring again to Fig. 5, fluid pressure may be built up in port 84a by shifting spool 76a in either direction and if, as seen in Fig. 6, spool 76a is shifted to the left, port 66a is blocked, resulting in pressure in port 84a. This pressure is transmitted to a port 96a and transmitted through a passageway 94b to a port 128a in an interlocking safety device 122a identical with above-mentioned interlocking device 122 except that plug 164 has been removed. Such fluid pressure forces a valve element 152a off its seat and the fluid proceeds through conduit 224 to cylinder 226, actuating piston 230 as just described. With an implement suspended on rods 32 and 34, and spool 76a returned to the Fig. 5 position, cylinder 226 will be under pressure as described in connection with cylinder 98, which pressure will react through conduit 224. However, fluid cannot return to bore 128a by reason of non-return valve element 152a and as in the previously described embodiment, if pump 50 is not running, valve spool 76a may be shifted in either direction and no pressure will be generated in port 84a. Furthermore, fluid cannot flow backwardly through valve 205 by reason of the action of non-return valve 152a.

When it is desired to lower the implement or load on rods 32 and 34, valve spool 76a is shifted to the right as seen in Fig. 7, after again starting pump 50. Pressure is then generated in port 84a as aforesaid and transmitted to a port 92a communicating with a passageway 90b which leads into a port 126a in above-mentioned interlock 122a. As will be observed, interlock 122a is identical in construction to hereinbefore described interlock 122. However, the opening for above-described conduit 90a has been closed by a plug 238. Accordingly, fluid entering passageway 90b cannot escape through non-return valve 144a. However the pressure shifts an abutment 132a to the right as seen in Fig. 7, a finger 158a pressing valve element 152a off its seat so that fluid under pressure in conduit 224 may return through port 128a and passageway 94b to port 96a. The shifting of spool 76a will have placed land 88a beyond a port 100a which communicates with reservoir 46 so that fluid may exhaust from the right side of piston 230 and allow rods 32 and 34 to drop by reason of the load thereon with counterclockwise oscillating of arms 36 and 38, shaft 40, and arm 234. Shifting of abutment 132a to the right uncovers a port 160a so that fluid coming from passageway 90b may enter a passageway 162a and return to reservoir 46, thus allowing substantial flow of fluid to avoid building excess pressure or causing undesirable heating of the fluid by unnecessary pumping against a high pressure.

Returning to Fig. 5, it will be observed that land 88a overlaps port 100a to a certain extent, thus providing for a small amount of travel of spool 76a before port 100a is uncovered. Land 86a also overlaps port 84a, but, as will be observed, to a lesser extent than land 88a overlaps port 100a. Because of these relations, precise control of the lowering movement of any load on rods 32 and 34 is readily possible. Thus a small amount of movement of spool 76a toward the Fig. 7 position will admit fluid from port 84a to port 92a, shifting abutment 132a and opening non-return valve 152a. Pressure fluid in conduit 224 is therefore admitted into passageway 94b but port 100a will not have been uncovered at this stage of the movement. An analogous situation is shown in Fig. 8 in which port 100b is blocked by land 88b, although port 84b is open to port 92b. Therefore piston 230 is still maintained in position by pressure fluid. Slight further movement of spool 76a will slightly uncover port 100a and allow a slow flow of fluid through passageway 102 (Fig. 2) to reservoir 46, and the rate of such flow can be accurately regulated by care in manipulating spool 76a so that rods 32 and 34 may be lowered as slowly or as fast as desired.

Consideration of Fig. 3 will show that the same relation exists in the valve when used for a double acting cylinder, in this case the same action taking place on whichever end of the cylinder happens to be under pressure because of the load controlled by the cylinder.

The modification shown in Fig. 8 is for use with the single acting type of cylinder as 226 wherein it is desired to have a predetermined slow rate of lowering of an implement. In this case abutment 132b has been shifted to the left (valve 205a in this instance being shown in a reversed position) exposing port 160b and opening non-return valve 152b in a manner similar to the operation hereinbefore described. In this case, however, spool 76b has not been shifted far enough to uncover port 100b. However, a suitable relief or flat spot 240 on the surface of abutment 132b is moved into position to interconnect ports 128b and 160b so that a small amount of fluid or pressure from cylinder 226 may escape into port 160b and pass on to reservoir 46, allowing for a slow drop of the load imposed on rods 32 and 34. The speed of such drop may be predetermined by controlling the size of the relief 240 and, of course, further movement of spool 76b will uncover port 100b and allow for a rapid drop of the load as explained in connection with the other embodiments.

Valve 205 being, as hereinbefore stated, identical with valve 70, has the same type of detent 184a and actuating spring 192a, and spool 76a is actuated from a lever 242 in the present instance also pivoted on above-mentioned fulcrum 166 and controlling spool 76a through a link 244 and a lever arm 246 in a manner substantially identical with that described for spool 76.

The operation of the device is thought to be clear from the foregoing description and it is apparent that with pump 50 in operation, fluid motors 98 and 226 may be controlled with assurance by merely manipulating levers 108 and 242 respectively; that precise control may be effected of either fluid motor merely by the exercise of reasonable care in the manipulation of the associated lever; that a predetermined slow speed drop may be obtained in the case of rods 32 and 34; and that the device operates, when the tractor is unattended and pump 50 is not running, to prevent the lowering of any load which may be suspended by either one of the fluid motors. It will also be apparent that the valve construction for obtaining these results with either a double acting fluid motor or a single acting fluid motor is identical, the only alteration being the interchange of suitable plugs when adapting the valve for one use or the other.

The above being a complete description of an illustrative embodiment of the invention, what is claimed as new and desired to be secured by Letters Patent of the United States is:

1. In an interlock for use in a hydraulic power-lift of the type including a distributing valve, a fluid motor, a conduit leading from said valve for passage of fluid to and from said motor, and a second conduit leading from said distributing valve, said interlock comprising the combination of a displacement chamber, a shiftable plunger in said chamber, one of said conduits leading from said distributing valve into said chamber on one side of said plunger, and the other leading into said chamber on the other side of said plunger, a first non-return valve leading out of said chamber on one side of said plunger, a second non-return valve leading out of said chamber on the other side of said plunger, and said first conduit continuing to said motor from said first non-return valve, on said plunger constituted, upon movement of said plunger by reason of fluid pressure on one side thereof to disable the non-return valve on the other side of said plunger, whereby fluid pressure in one conduit will cause shifting of said plunger and disabling of the non-return valve in the other conduit, fluid being prevented from escaping from said motor through the first conduit in the absence of pressure in the other conduit, and said displacement chamber providing an outlet port blocked by said plunger from communication with said first conduit but communicating with said second conduit when said plunger is shifted by pressure directed to said second conduit by said distributing valve, whereby to dispose of fluid traversing said second conduit when said interlock is connected to a single-acting fluid motor.

2. A convertible interlock for use in a hydraulic circuit of the type including a hydraulic motor, a distributing valve and a source of pressure fluid, said interlock comprising the combination of a valve body having a bore, a slidable abutment in the bore, a motor actuating fluid conducting port communicating with said bore on either side of said slidable abutment whereby said abutment will be caused to move by reason of a difference in pressure of fluid between said ports, and an exhaust port opening out of said bore between the aforementioned ports and of a size and positioned to be blocked by said abutment except when said abutment is moved by reason of said difference in pressure, a non-return valve opening out of said bore at either side of said abutment, means connected with said abutment for disabling one of said valves by reason of movement of said abutment in one direction, and for disabling the other valve by reason of movement of said abutment in the other direction, and means for blocking said exhaust port for actuation of a double acting hydraulic motor with said interlock, and for opening said exhaust port for actuation of a single acting hydraulic motor with said interlock.

3. A convertible interlock for use in a hydraulic circuit of the type including a hydraulic motor, a distributing valve and a source of pressure fluid, said interlock comprising the combination of a valve body having a bore, a slidable abutment in the bore, a motor actuating fluid conducting port communicating with said bore on either side of said slidable abutment whereby said abutment will be caused to move by reason of a difference in pressure of fluid between said ports, an exhaust port opening out of said bore between the aforementioned ports in a position to be blocked by said abutment except when said abutment has been moved by reason of said difference in pressure, said exhaust port being adapted to be plugged for use of said interlock in connection with a double acting hydraulic motor, and to be opened while one of said motor actuating fluid conducting ports is plugged, for use of said interlock in connection with a single acting hydraulic motor, a non-return valve opening out of said bore at either side of said abutment, and means connected with said abutment for disabling one of said valves by reason of movement of said abutment in one direction, and for disabling the other valve by reason of movement of said abutment in the other direction.

4. A convertible interlock for use in a hydraulic circuit of the type including a hydraulic motor, a distributing valve and a source of pressure fluid, said interlock comprising the combination of a valve body having a bore, a slidable abutment in the bore, a motor actuating fluid conducting port communicating with said bore on either side of said slidable abutment whereby said abutment will be caused to move by reason of a difference in pressure of fluid between said ports, an exhaust port opening out of said bore between the aforementioned ports in a position to be blocked by said abutment except when said abutment has been moved by reason of said difference in pressure, said exhaust port being adapted to be plugged for use of said interlock in connection with a double acting hydraulic motor, and to be opened while one of said motor actuating fluid conducting ports is plugged, for use of said interlock in connection with a single acting hydraulic motor, a non-return valve opening out of said bore at either side of said abutment, means connected with said abutment for disabling one of said valves by reason of movement of said abutment in one direction, and for disabling the other valve by reason of movement of said abutment in the other direction and said abutment having a relieved portion bridging said exhaust port and one of said motor actuating fluid conducting ports when said abutment is moved in one direction.

5. A convertible interlock for use in a hydraulic circuit of the type including a hydraulic motor, a distributing valve and a source of pressure fluid, said interlock comprising the combination of a valve body having a bore, a slidable abutment in the bore, a motor actuating fluid conducting port communicating with said bore on either side of said slidable abutment whereby said abutment will be caused to move by reason of a difference in pressure of fluid between said ports, an exhaust port opening out of said bore between the aforementioned ports in a position to be blocked by said abutment except when said abutment has been moved by reason of said difference in pressure, said exhaust port being adapted to be plugged for use of said interlock in connection with a double acting hydraulic motor, and to be opened while one of said motor actuating fluid conducting ports is plugged, for use of said interlock in connection with a single acting hydraulic motor, a non-return valve opening out of said bore at either side of said abutment, means connected with said abutment for disabling one of said valves by reason of movement of said abutment in one direction, and for disabling the other valve by reason of movement of said abutment in the other direction, and said abutment having means providing for a restricted flow of fluid, said means bridging said exhaust port and one of said motor actuating fluid conducting ports when said abutment is moved in one direction.

References Cited in the file of this patent

UNITED STATES PATENTS

| | | |
|---|---|---|
| 2,339,001 | Clay et al. | Jan. 11, 1944 |
| 2,377,278 | Stephens | May 29, 1945 |
| 2,621,593 | Schmiel | Dec. 16, 1952 |
| 2,625,168 | Charlson | Jan. 13, 1953 |
| 2,648,346 | Deardorff et al. | Aug. 11, 1953 |
| 2,654,349 | Ziskal | Oct. 6, 1953 |
| 2,689,585 | Presnell | Sept. 21, 1954 |
| 2,716,966 | Hubert et al. | Sept. 6, 1955 |
| 2,718,240 | Margrave | Sept. 20, 1955 |
| 2,720,755 | Gardiner | Oct. 18, 1955 |

UNITED STATES PATENT OFFICE
CERTIFICATION OF CORRECTION

Patent No. 2,964,016　　　　　　　　　　　　　　　December 13, 1960

John F. Talak

It is hereby certified that error appears in the above numbered patent requiring correction and that the said Letters Patent should read as corrected below.

Column 8, line 28, after "valve," and before "on" insert -- means --.

Signed and sealed this 16th day of May 1961.

(SEAL)
Attest:

ERNEST W. SWIDER
Attesting Officer

DAVID L. LADD
Commissioner of Patents